April 19, 1966  J. F. CHIEFFE  3,246,564
PROTECTIVE LIGHTWAY FOR FALLOUT SHELTERS
Filed April 26, 1962
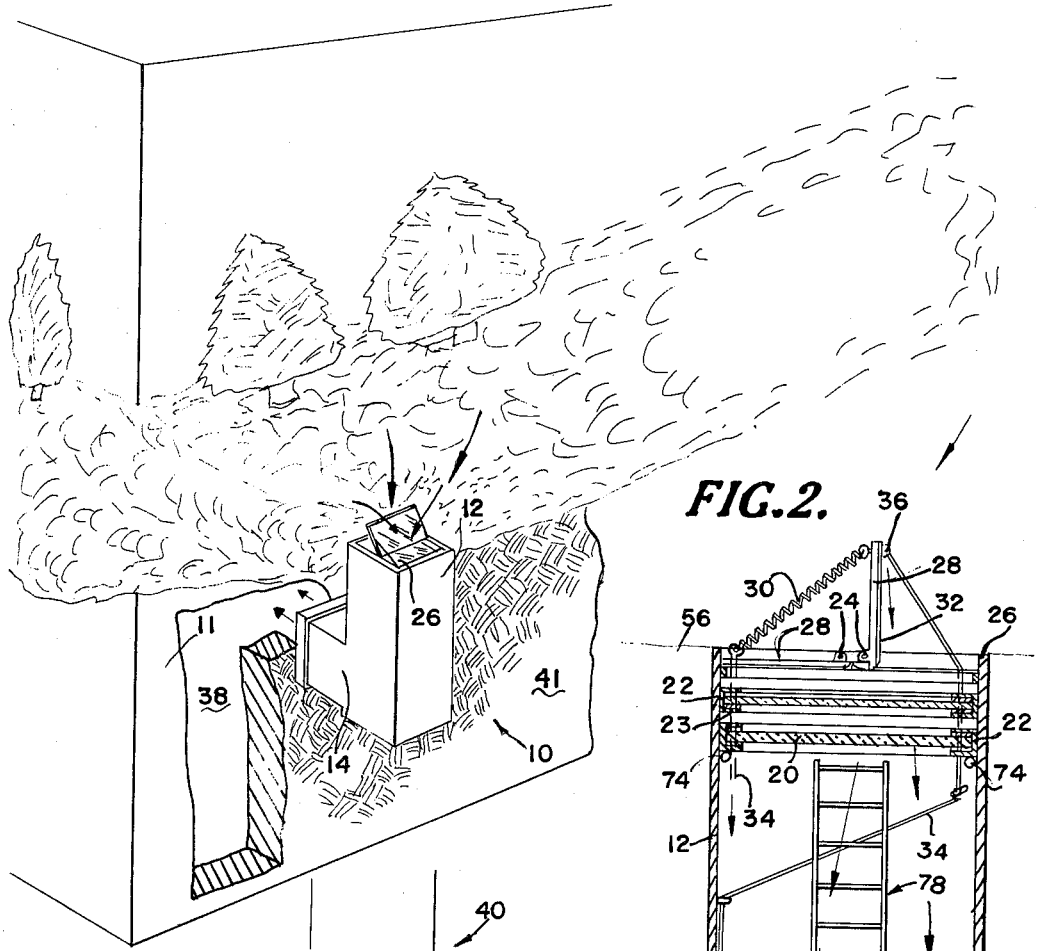
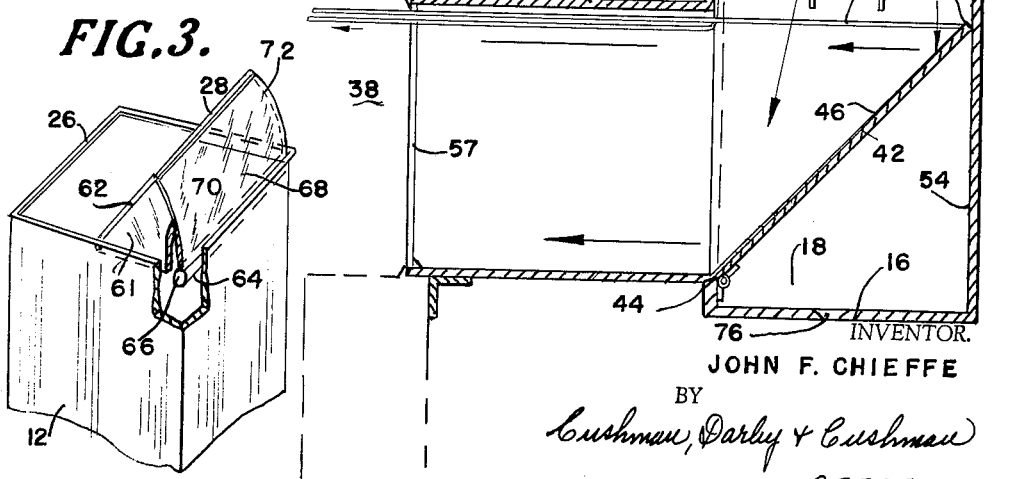
INVENTOR.
JOHN F. CHIEFFE
BY
Cushman, Darby & Cushman
ATTORNEYS

United States Patent Office 3,246,564
Patented Apr. 19, 1966

3,246,564
PROTECTIVE LIGHTWAY FOR
FALLOUT SHELTERS
John F. Chieffe, 109 Berkeley Road,
Avondale Estates, Ga.
Filed Apr. 26, 1962, Ser. No. 190,417
9 Claims. (Cl. 88—59)

This invention generally relates to subterranean fallout shelters and, more particularly, to a novel lightway for redirecting daylight into the shelter interior while affording protection from atomic radiation.

In recent years it has become apparent that although a nuclear war is to be abhorred, it is necessary that the general public be prepared for such an event if it should occur. The purpose of the present invention is primarily concerned with directing sunlight into the shelter during daylight hours to supplement or eliminate the necessity of artificial means for lighting the shelter interior during those hours, while simultaneously preventing the entry of radioactive fallout material.

Although the blast effect in the vicinity of ground zero will normally demolish any known type of shelter construction, fallout from the surface blast will disperse radioactive particles of fatal intensity over a wide area. The heavier debris descends during the first hour or so while the lighter particles take several hours or more after being widely scattered over hundreds of square miles of the earth's surface by atmoshperic wind conditions. When a nuclear device is exploded close to the ground, the products of fission from the explosion agglomerate with larger particles of debris, 80% of which settles to earth within a few hours in the form of local fallout. The remaining 20% of the fission products rise into the stratosphere where they remain suspended until subsequently deposited through precipitation in the form of global fallout.

Studies indicate that although the radiation level may be extremely high shortly after the initial blast, it drops rapidly. A simplified rule of thumb is to the effect that with every increase in time by a factor of seven, the radiation level decreases by a factor of ten. In other words, seven hours following the bomb burst, the radiation level is approximately 10% of the level in the first hour. However, in actual practice, the rate of decay is not so easily determined because a series of blasts may take place over an extended period of time and the initial fallout will probably not arrive until the lapse of a certain period of time. Then, too, surface winds may cause the fallout to be more widely dispersed in one locale than in another. But, the aforementioned rule of thumb as an initial approximation is very accurate after initial atmospheric turbulence subsides. Accordingly, once the initial blast has occurred, it is necessary for people to remain out of contact with the radioactive atmosphere until the level of radioactivity decreases sufficiently to allow near-normal human habitation.

The hazards from radiation stem from the fallout particles themselves, since the air through which they pass and the surfaces on which they are deposited do not themselves become radioactive. The alpha and beta particles emitted from the fallout material penetrate such a short range that they are dangerous only if inhaled, injested or brought into contact with the skin. On the other hand, gamma and neutrons radiation is extremely perilous due to a high penetration factor.

Alpha particles can be stopped after passing through one inch of air or a sheet of tissue paper. Beta particles will be absorbed after passing through ten feet of air or a sheet of aluminum foil. While shielding can be completely effective against apha and beta radiation, the concept of "half-thickness" is useful in understanding the absorption of gamma radiation by various materials. For example, if a particular thickness of material, say one-half inch of lead, reduces the gamma intensity by one-half, the next half inch will reduce it another one-half, for a total reduction of three-fourths. The next half-thickness would reduce it to one-third, then one-sixteenth, and so forth. While the reduction would never reach zero, for practical purposes it is only necessary that the radiation intensity be reduced to a level which would be fit for normal human activity without causing radiation sickness or death. In this regard, different substances reduce the radiation effect by different amounts. Tests have indicated that eleven inches of earth, eight inches of concrete or one inch of lead will all serve to reduce the gamma intensity to one-tenth its original level. Twice that amount of each of the substances will reduce it to one-hundredth, and three times that amount, or thirty-three inches of earth, twenty-four inches of concrete, or three inches of lead will attenuate the original radiation intensity by a factor of one thousand.

Empolying the "half-thickness" principle of radiation, numerous fallout shelters have been designed to protect its occupants for varying periods, some for a week, others for considerably longer intervals of time. Some of these designs can be found in the Government pamphlet entitled "The Family Fallout Shelter," published June 1959 by the Office of Civil and Defense Mobilization. However, a drawback of each of these shelters is the fact that they fail to provide any means for directing sunlight into the shelter interior. Candles and other flame producing devices are undesirable in that combustion is depedent upon oxygen which is vital to the survival of the shelter occupants. Flashlights and electric lanterns are dependent upon short-lived batteries which must be conserved.

Accordingly, it is the principal object of this invention to provide a novel subterranean lightway for redirecting sunlight into a fallout shelter during the daylight hours while fully protecting the shelter interior from the adverse effects of radiation.

An important object of this invention relates to a subterranean lighting having a primary hollow end positioned to receive daylight and the opposite end interconnected to a secondary shaft axially displaced in oblique relation with the primary shaft, and reflective means disposed within the shafts for redirecting light from the first shaft through the second into the interior of an associated fallout shelter without deflection of radiation.

A further object of the present invention is to provide a lightway hatch assembly for a fallout shelter of the above character which is extremely simple in construction, thoroughly reliable and effective in operation, neat and attractive in appearance, completely safe, relatively inexpensive to manufacture, and otherwise well adapted for the purposes for which the same is intended.

Other objects and the entire scope of the present invention will become apparent from the detailed description given hereinafter. It should be understood, however, that the detailed description and specific example, while indicating the preferred embodiments of the invention, are given by way of illustration only, since various changes and modifications within the spirit and scope of the invention will become apparent as the description herein progresses.

Reference is made to the accompanying drawings which form a part hereof, wherein like numerals refer to similar parts throughout, and in which:

FIGURE 1 is a perspective view partially cut away and in section illustrating a novel lightway hatch assembly and associated fallout shelter submerged below ground for protection from radiation, FIGURE 2 is a vertical elevational view, partially in section, showing the details of the lightway hatch assembly illustrated in FIGURE 1, and FIGURE 3 is a partial perspective view, with parts removed, of a modified form of hatch to be employed with the lightway illustrated in FIGURE 2.

Referring now with more particularity to the drawings, there is generally indicated at 10, a lightway hatch assembly constructed in accordance with the present invention below ground in associated relation with a conventional fallout shelter 40. Lightway 10 is employed to redirect daylight into the interior of the associated shelter in order to conserve various artificial means of illumination which are necessarily required at night time when sunlight would not be available. It is also necessary that the disclosed structure be built in such a manner as to protect against the effects of radiation by shielding the shelter interior from direct exposure to alpha and beta particles and absorbing the major portion of the gamma radiation.

With this in mind, the lightway hatch assembly 10 has been designed with a primary vertically disposed shaft member 12 extending downwardly below ground and interconnected at its lower end with a secondary horizontally extending shaft 14 that directly communicates with the shelter interior. Each of the shafts are hollow and are constructed in such a manner that at the point where they join together, the axial center line of the vertical shaft 12 is angularly disposed with respect to the axial center line of the secondary horizontal shaft 14.

The primary shaft 12 includes a bottom member 16 which serves to define a depressed sump 18 recessed below shaft 14. A number of horizontally disposed panes 20 of substantially rigid transparent material, such as Plexiglas, are sealably secured to the upper portion of shaft 12, serving to collect any radioactive debris or fallout dust. These panes are individually attached to the primary shaft 12 by means of brackets 22 separated by a resilient gasket material indicated at 23 which yields when a slight amount of pressure is applied to the pane surfaces.

Mounted adjacent the upper rim 26 of shaft 12 are a pair of hatch members 28, each of which are separately hinged for pivotal movement at 24 and cover approximately one half of the opening into the vertical shaft. A resilient spring member 30 connected to each of the hatch members at their outer ends serves to move the related hatch member to a raised position. The underside of each of the hatch members 28 has a mirror-like surface indicated at 32 which will reflect not only light but images as well. A wire 34 is attached at 36 to the outermost portion of each hatch member 28 and extends downwardly through suitable grooves formed in the gasket material 22 into the secondary shaft 14 from whence it enters the interior 38 of the shelter 40. Each of the wire members 34 can be manually or mechanically manipulated by suitable means (not shown) to control the movement of each hatch member 28 between a light-receiving open portion and closed protective portion.

A panel closure member 42 is hinged at 44 adjacent the base of the vertical shaft 12 for pivotal movement between a closed protective position and open reflective position as shown in FIGURE 2. The upper surface of the panel member 42 is provided with a light and image reflecting surface 46 which will directly cooperate with the reflective surface 32 of each hatch member 28 to redirect light into the selter interior. The panel member 42, like each of the hatch members 28, has secured thereto at the free end 48 a wire control member 50 which leads into the interior 38 of the fallout shelter so that the closure 42 can be selectively moved to a closed position against the side 52 of the primary shaft 12 or released to open reflective position against the side wall 54 of shaft 12. When the panel member 42 assumes the opened position shown in FIGURE 2, the reflective surface 46 is substantially disposed at an angle of 45° from the horizontal and when either hatch member 28 is similarly disposed in open position at an angle of approximately 45° from the horizontal, the image of the surrounding landscape as well as daylight will be reflected from the surface 32 of the hatch member 28 onto the surface 46 of the panel member 42. The light image formed on reflective surface 46 is then redirected into the interior 38 of the shelter 40.

The upper rim 26 of the vertical shaft 12 preferably lies in the plane of the ground surface 56 so that the lightway hatch will be protected and unaffected by the blast or thermal effect of an exploded bomb. In the event the debris collecting panes 20 are destroyed by the blast, a secondary pane 57 has been provided at the entrance of the horizontal shaft 14 to prevent the possibility of alpha and beta radiation from entering the shelter interior 38.

The length of the horizontal shaft 14, and therefore the distance between the primary shaft wall 52 and side wall 41 of the shelter 40 can be calculated by the "half-thickness" principle to provide the desired reduction in gamma radiation. Further protection is provided by drawing the wire member 50 to the left in order to seal the panel closure member 42 against side wall 52 of the vertical shaft. In this manner alpha and beta radiation may be effectively prevented from entering the shelter interior until after the level of radiation intensity has decreased.

A ladder 78 may also be provided for the shaft 12 to allow the occupants to leave the shelter when the intensity of radiation has dropped to a level which is safe for habitation.

The lightway which has been described, therefore, serves a threefold purpose. It serves to redirect light into the interior of the shelter during the daylight hours and can be employed to view the surrounding area. While performing the two functions, it also provides the occupants of a shelter with protection from the harmful effects of atomic fallout.

In the modified embodiment illustrated in FIGURE 3, the transparent panes 20 have been removed and replaced by a pair of quadrant-shaped, downwardly depending side shields 61 formed from Plexiglas or other rigid material secured to the edges 62 of the hatch members 28. A roll 64 of transparent flexible sheet material, such as polyethylene or the like, is rotatably mounted upon roller 66 adjacent the upper rim 26 of shaft 12. One end of the flexible transparent material 68 is secured along the forward edge 70 of each hatch member 28 while the other is wrapped around the spring biased roller 66. As hatch member 28 is raised to the position shown in FIGURE 3, the material 68 is drawn upwardly and unwrapped from the roll 64. When the hatch member is closed, the spring biased roll will rotate rolling the transparent material back around its surface. The tension applied to the polyethylene material 68 along the arcuate edges 72 of the quadrant shaped panes 50 is sufficient to form a seal that will prevent radioactive particles from entering the lightway shaft 12. Suitable gasket material may also be employed around the rim 26 adjacent the shields 61 to serve as an adequate seal.

Although not shown, it might be advantageous to employ a streamlined plastic transparent dome structure above the primary shaft 12 which can be sealably secured to the upper rim 26 thereof. In any event, the panes 20 or the rolls 64 preferably are removable so as to provide an alternate exit from the shelter.

Finally, it should be understood that the present invention is directed to the novel lightway fallout hatch disclosed herein which may be interconnected in any well known fashion with any type of conventional fallout shelter of existing design. Moreover, the precise dimensions required to effectively adsorb high levels of radiation may be varied to meet the conditions of protection desired by following the "half-thickness" principle in shielding the shelter interior from direct exposure to radiation. Thus, any radiation vector emanating from the fallout material deposited on the upper transparent protective panes 20 will pass through a sufficient amount of earth or other shielding material to effectively reduce the level of radiation to the desired intensity before reaching the shelter interior in accordance with the "half-thickness" principle previously described. Of course, the mirrored reflective surface 46 employed to redirect the light through the secondary shaft 14 will not deflect the direction of the radiation vector but rather will allow the same to continue along its path with a maximum deviation in the order of one-thousandth of an inch, depending on the reflective material employed. Accordingly, by redirecting the light without appreciable deflection of radiation, the mirrored surface, in effect, serves as a radiation filter by reflecting light directly into the shelter interior while preventing direct exposure to the radiation vector emitted from the radioactive fallout deposited on the protective transparent panes 20.

In the event any radioactive fallout should collect in the vertical shaft 12, it can be initially removed by washing down the shaft walls with a suitable spray system 74 located adjacent the protective panes 20 before the hatch 42 is moved to open position. The radioactive waste will collect in the sump 18 adjacent the bottom of the primary shaft 12 where it can be removed through a drain 76. In addition, the hatch 42 can be constructed from a suitable shielding material for absorbing any radiation emanated from fallout dust collected in the sump 18.

It is also to be understood that, although several preferred embodiments of the invention have been shown in the drawings and described with considerable particularity in the foregoing specification, the invention is not limited to the specific details of construction, shown and described, but includes all modifications coming within the scope of the appended claims and their equivalents.

What is claimed is:

1. In a radiation shelter having a personnel chamber surrounded by radiation shielding material for reducing to a safe level the amount of radiation which penetrates into the chamber from an exterior source, the improvement which comprises: means for providing an auxiliary passageway for movement of personnel into or out of the chamber and for illuminating at least a portion of the chamber with daylight while preventing any substantial amount of fallout material or radiation from entering the chamber, said means comprising a primary hollow shaft with one end positioned to receive daylight; a secondary hollow shaft communicating at an angle to and interconnected with the opposite end of said primary shaft, said shafts passing through the radiation shielding material and being of such relative length that radiation entering said one end of said primary shaft is intercepted by the shielding material, said shafts being of a transverse dimension sufficient to permit movement of personnel therethrough; light reflecting means disposed at the interconnection of said shafts for redirecting light from said primary shaft into said secondary shaft; and removable transparent protective means associated with said primary shaft sealing the same against entry of fallout material.

2. Apparatus as in claim 1 further comprising: protective closure means disposed at the interconnection of said shafts, said closure means carrying said light reflecting means and being movable between a closed position for sealing said secondary shaft and an open position to permit light to be reflected from said reflecting means into said secondary shaft; and operating means located within the chamber for selectively moving said closure means between open and closed positions.

3. Apparatus as in claim 1 further including spray means disposed within said primary shaft for purging fallout material from the walls of said primary shaft.

4. Apparatus as in claim 1 further including light reflecting means disposed adjacent said one end of said primary shaft, said light reflecting means being carried on a protective closure member which is movable between a closed position for at least partially sealing said primary shaft and an open position to permit light to be reflected into said primary shaft; and operating means located within the chamber for selectively moving said closure means between open and closed positions.

5. Apparatus as in claim 2 wherein said primary shaft is generally upright, said apparatus further including spray means within said primary shaft for purging the same when said closure means is in closed position, and drain means within said primary shaft below the point where the latter interconnects with said secondary shaft for removing the purged fallout material.

6. In a radiation shelter having a personnel chamber surrounded by radiation shielding material for reducing to a safe level the amount of radiation which penetrates into the chamber from an exterior source, the improvement which comprises means for illuminating at least a portion of the chamber with daylight while preventing any substantial amount of fallout material or radiation from entering the chamber, said means comprising: a primary hollow shaft with one end positioned to receive daylight; a secondary hollow shaft communicating at an angle to and interconnected with the opposite end of said primary shaft, said shafts passing through the radiation shielding material and being of such relative length that radiation entering said one end of said primary shaft is intercepted by the shielding material; light reflecting means disposed at the interconnection of said shafts for redirecting light from said primary shaft into said secondary shaft; transparent protective means associated with said primary shaft for sealing the same against entry of fallout material; protective hatch means disposed at said one end of said primary shaft for movement between an open position to allow passage of light into said primary shaft and a closed position to protect the interior of said shaft from physical damage; and operating means located within the chamber for selectively moving said hatch means between open and closed positions.

7. For use with a fallout shelter, a lightway for directing light into the shelter interior while excluding radiation and fallout material comprising: a primary hollow shaft disposed below ground with one end positioned to receive daylight; a secondary hollow shaft communicating at an angle to and connecting with the opposite end of the primary shaft; a reflecting and closure member disposed at the connection of said shafts, said member being movable between an open position for redirecting light from said primary shaft through said secondary shaft and a closed position for closing the communication between said shafts; transparent protective means associated with said primary shaft for sealing the same against entry of fallout material; and protective hatch means at said one end of said primary shaft, said hatch means being movable between open and closed positions.

8. Apparatus as in claim 7 wherein said hatch means includes a door-like member pivoted for movement toward and away from said one end of said primary shaft, said member having a reflective surface on the side facing into said primary shaft.

9. Apparatus as in claim 7 further including ladder means within said primary shaft and wherein said transparent protective means is removable and wherein said shafts are of sufficient size to permit passage of personnel whereby said shafts may serve as an auxiliary entrance or exit for the shelter.

References Cited by the Examiner

UNITED STATES PATENTS

| | | | |
|---|---|---|---|
| 289,537 | 12/1883 | Hyatt | 88—59 |
| 751,569 | 2/1904 | Spear | 88—69 |
| 867,982 | 10/1907 | Lake | 88—72 X |
| 826,155 | 7/1906 | Dudley | 88—69 |
| 867,982 | 10/1907 | Lake | 88—72 X |
| 1,254,520 | 1/1918 | Macduff | 88—57.5 |
| 2,288,143 | 6/1942 | Sheppard | 88—69 X |
| 2,395,310 | 2/1946 | Wilson | 88—69 |

JULIA E. COINER, *Primary Examiner.*